Oct. 1, 1963  M. W. DUNDORE ETAL  3,105,396
HYDRAULIC TORQUE CONVERTER

Filed March 31, 1959  13 Sheets-Sheet 1

Inventors.
Marvin W. Dundore.
Raymond C. Schneider.
By. John W. Darley
Attorney.

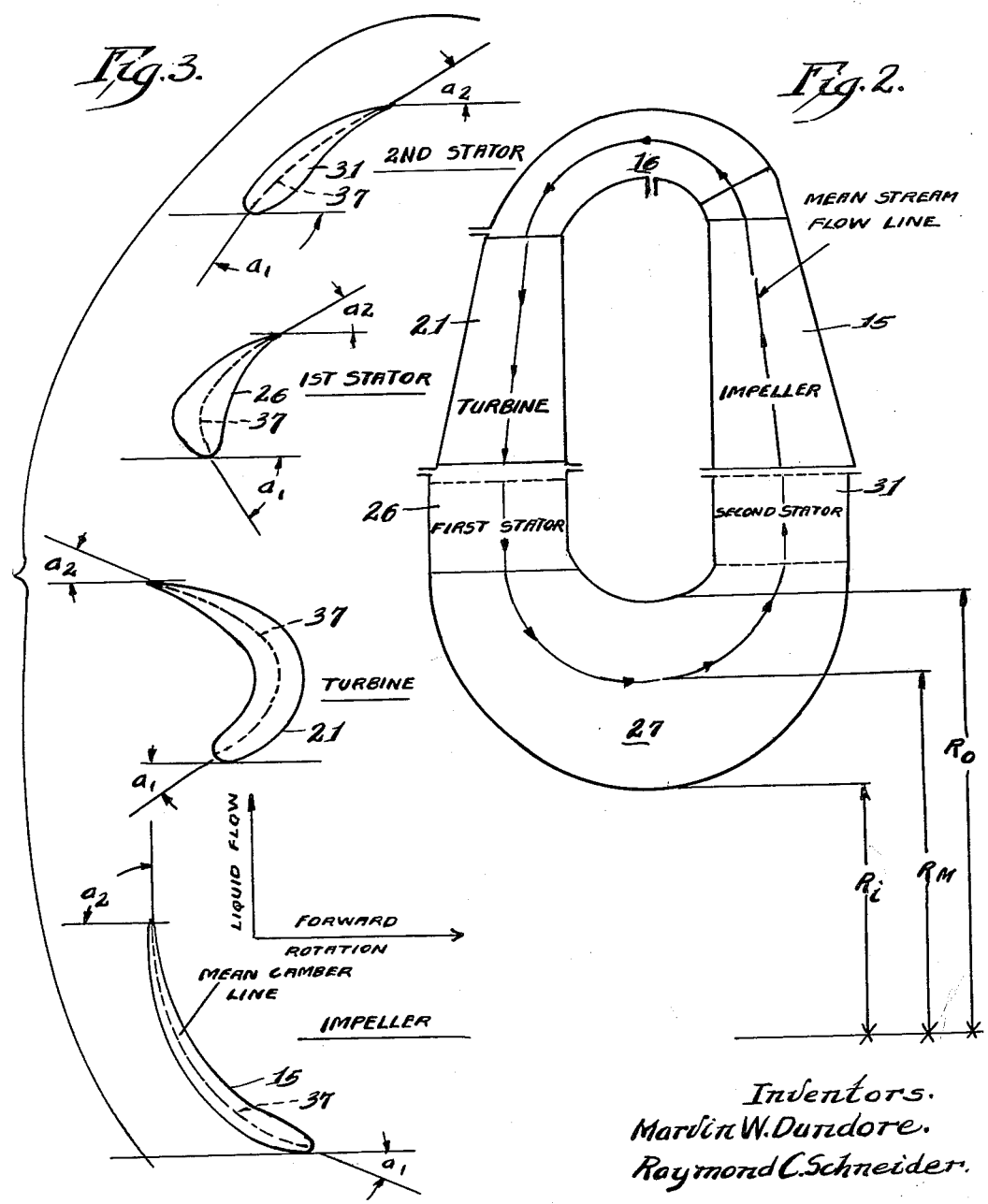

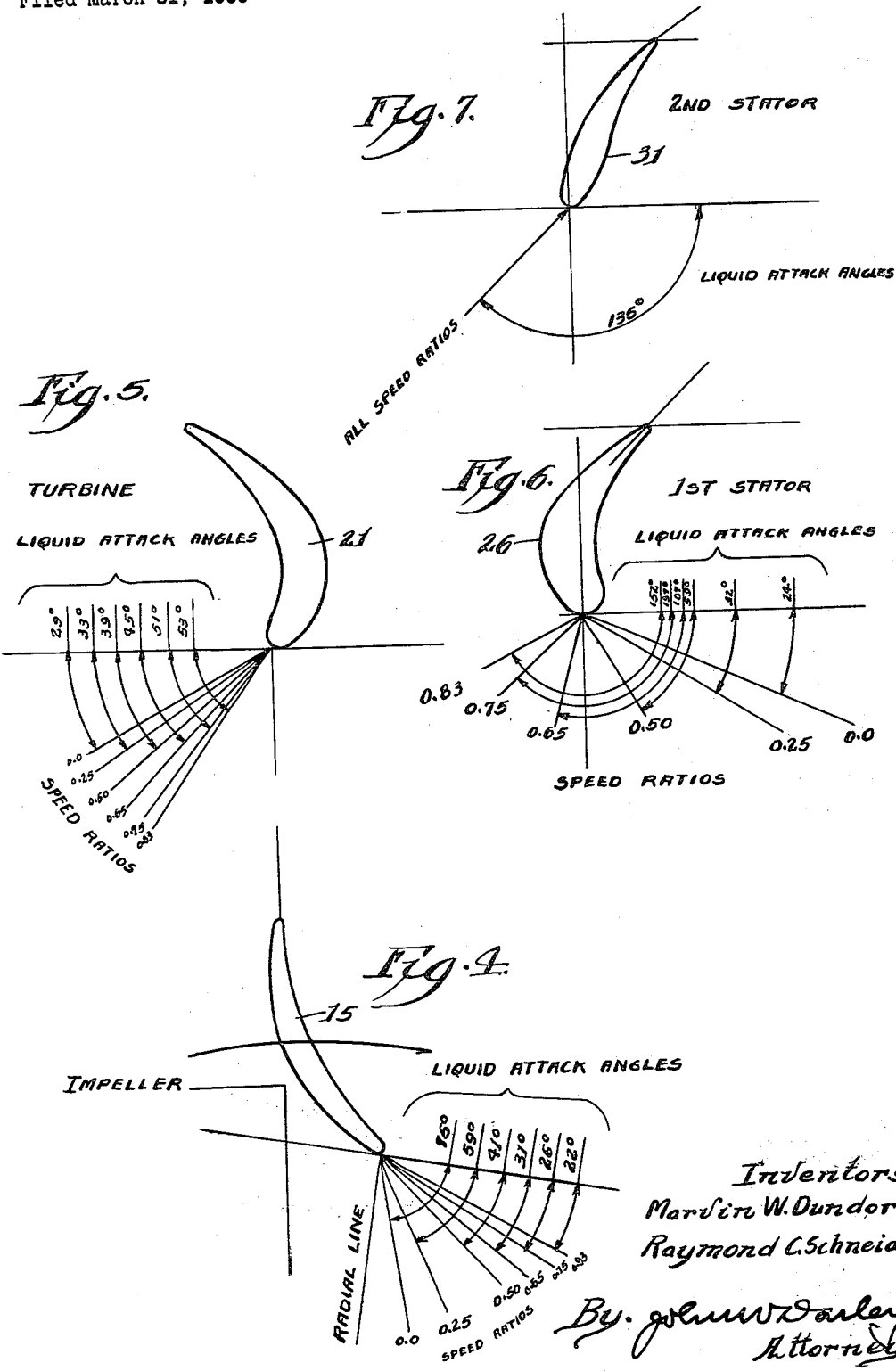

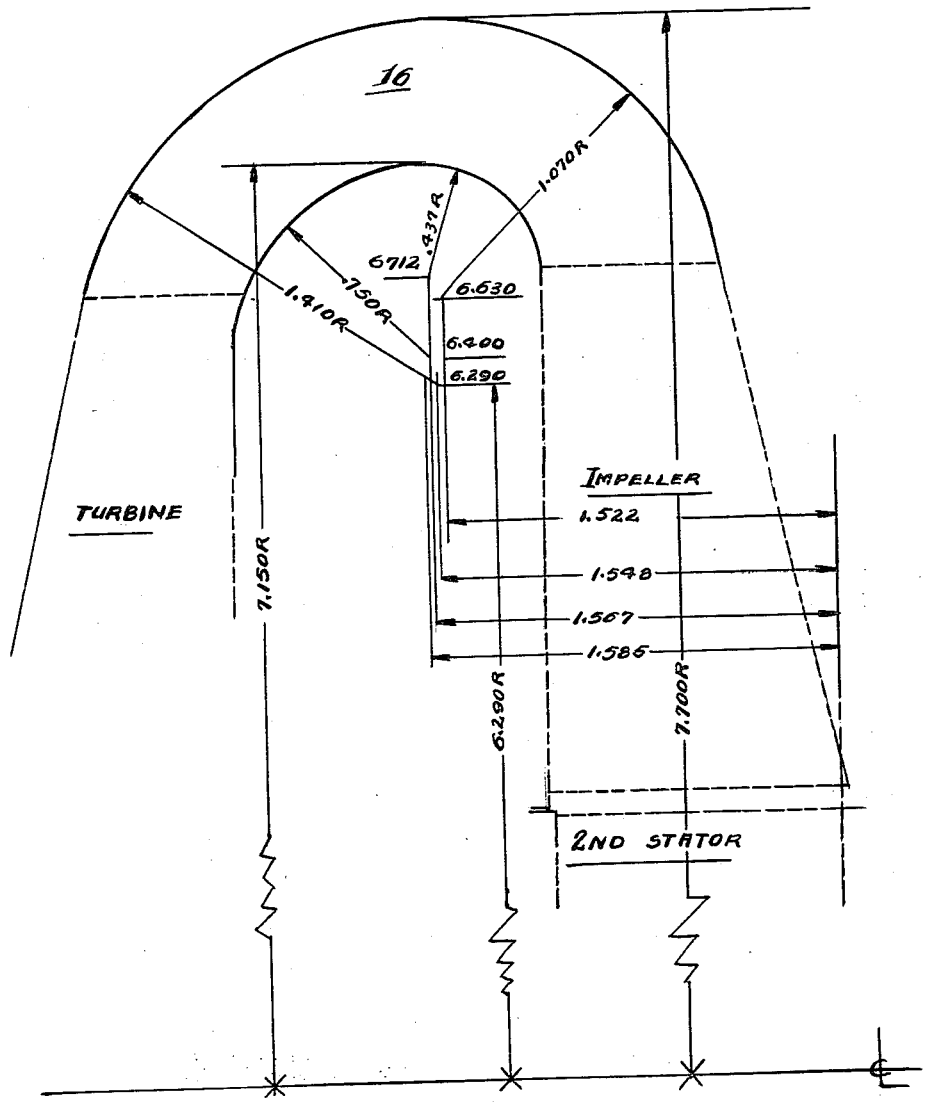

$R_1 = R_2$ FOR
1:1 SPEED RATIO
SHUT OFF

Inventors.
Marvin W. Dundore,
Raymond C. Schneider.
By. [signature]
Attorney.

Oct. 1, 1963          M. W. DUNDORE ET AL          3,105,396
                  HYDRAULIC TORQUE CONVERTER
Filed March 31, 1959                              13 Sheets—Sheet 6

| X  | 0.0  | .250 | .500 | .750 | 1.000 | 1.250 | 1.500 | 1.750 | 2.000 | 2.245 |
|----|------|------|------|------|-------|-------|-------|-------|-------|-------|
| $Y_1$ | .047 | .050 | .114 | .162 | .197  | .214  | .208  | .162  | .080  | .032  |
| $Y_2$ | .047 | .223 | .346 | .430 | .467  | .454  | .397  | .295  | .178  | .032  |

IMPELLER
CORE RING SIDE b = .585"
$a_1$ = 34°
$a_2$ = 90°

28 BLADES EQUALLY SPACED

Inventors.
Marvin W. Dundore.
Raymond C. Schneider.
By John W. Darley
Attorney.

| X | 0.0 | 0.06 | .150 | .300 | .500 | .700 | .900 | 1.100 | 1.300 | 1.500 | 1.700 | 1.900 | 2.026 |
|---|---|---|---|---|---|---|---|---|---|---|---|---|---|
| Y₁ | .06 | 0.0 | .042 | .178 | .332 | .415 | .443 | .438 | .403 | .340 | .257 | .171 | .153 |
| Y₂ | .06 | .332 | .505 | .675 | .787 | .827 | .809 | .752 | .661 | .540 | .405 | .261 | .153 |

TURBINE CORE RING SIDE $a_1 = 54°$
$a_2 = 30.2°$
$C = 505°$
30 BLADES EQUALLY SPACED

Inventors.
Marvin W. Dundore.
Raymond C. Schneider.
By John W. Daley
Attorney.

Oct. 1, 1963 — M. W. DUNDORE ETAL — 3,105,396
HYDRAULIC TORQUE CONVERTER
Filed March 31, 1959 — 13 Sheets-Sheet 8

| X | .000 | .050 | .100 | .150 | .200 | .250 | .300 | .350 | .400 | .450 | .500 | .600 | .700 | .801 |
|---|---|---|---|---|---|---|---|---|---|---|---|---|---|---|
| $Y_1$ | .086 | — | .000 | .007 | .029 | .040 | .054 | .063 | .070 | .073 | .072 | .063 | .037 | .000 |
| $Y_2$ | .086 | .229 | .213 | .280 | .282 | .272 | .259 | .240 | .221 | .200 | .178 | .130 | .077 | .017 |

1ST STATOR
CORE RING SIDE $a_1 = 75°$
$a_2 = 34.2°$
$c = .321"$

44 BLADES
EQUALLY SPACED

Inventors.
Marvin W. Dundore.
Raymond C. Schneider.
By John O. Darley
Attorney.

| X | .000 | .060 | .100 | .140 | .180 | .220 | .260 | .300 | .400 | .500 | .600 | .700 | .200 | .815 |
|---|---|---|---|---|---|---|---|---|---|---|---|---|---|---|
| $y_1$ | .092 | — | .010 | .003 | .000 | .000 | .005 | .013 | .043 | .062 | .066 | .055 | .030 | .000 |
| $y_2$ | .092 | .180 | .202 | .216 | .227 | .233 | .235 | .233 | .219 | .195 | .163 | .120 | .066 | .017 |

2ND STATOR
CORE RING SIDE
$a_1 = 115°$
$a_2 = 34°$
$C = 4.38"$
36 BLADES
EQUALLY SPACED

Inventors.
Marvin W. Dundore.
Raymond C. Schneider.

By. John W Darley
Attorney.

Inventors.
Marvin W. Dundore.
Raymond C. Schneider.

By. [signature]
Attorney.

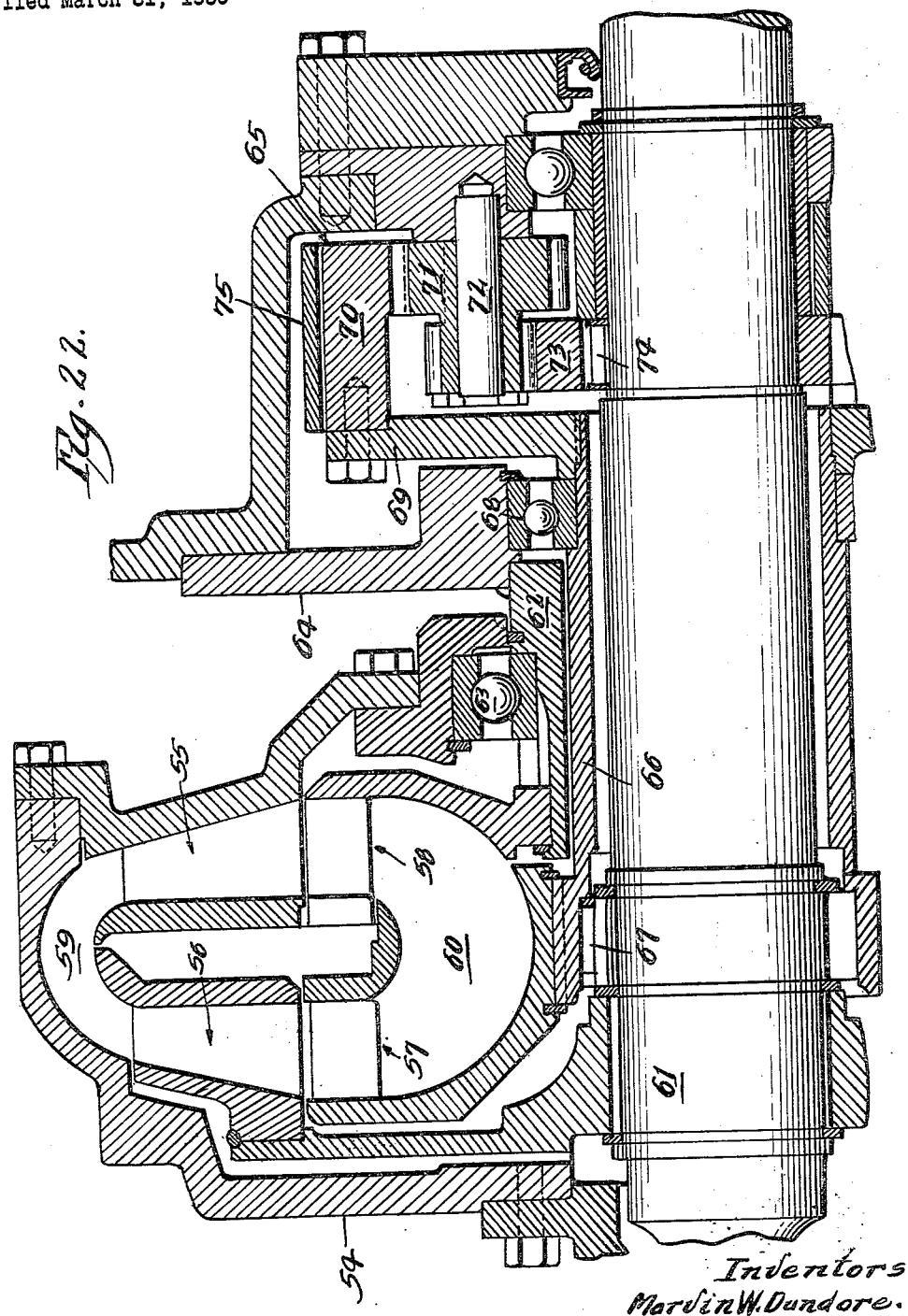

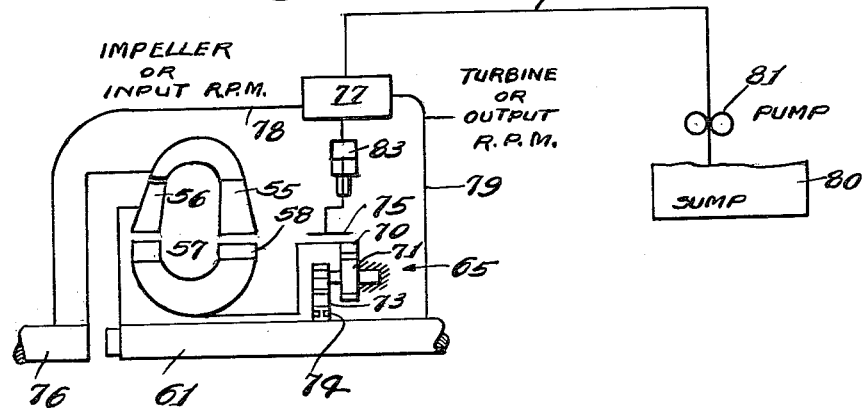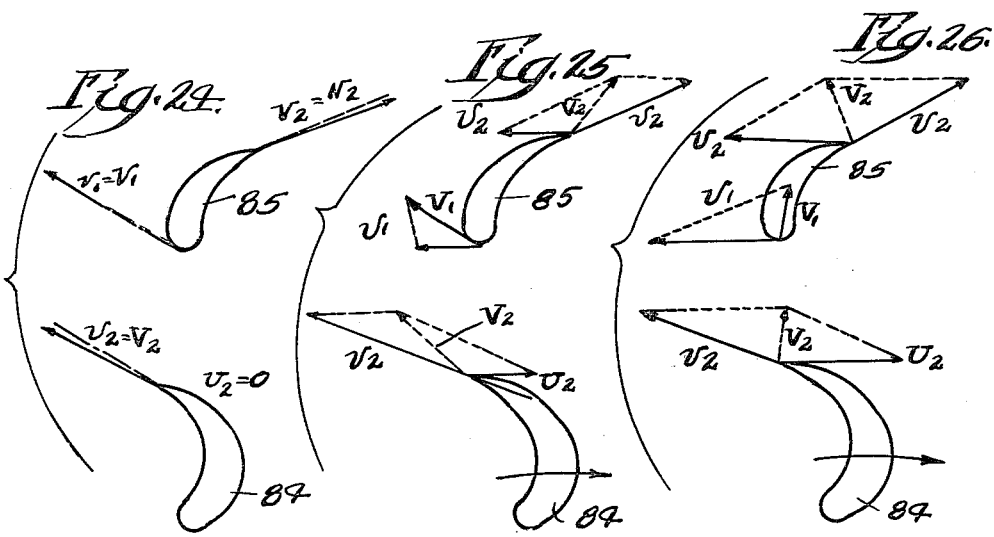

United States Patent Office 3,105,396
Patented Oct. 1, 1963

3,105,396
HYDRAULIC TORQUE CONVERTER
Marvin W. Dundore and Raymond C. Schneider, Rockford, Ill., assignors to Twin Disc Clutch Company, Racine, Wis., a corporation of Wisconsin
Filed Mar. 31, 1959, Ser. No. 803,283
9 Claims. (Cl. 74—789)

Our invention relates to a hydraulic torque converter of the single stage, rotating housing type which is characterized by an improved design.

One object of the invention is to provide a hydraulic torgue converter of the indicated type which includes dual stators that are related to the usual impeller and turbine components in such a way as to improve the flow of the working liquid through the toroidal circuit.

A further object is the provision of a converter as above including a radial outflow impeller, a radial inflow turbine, an inflow first stator positioned at the outlet of the turbine and a second stator outflow related to the inlet of the impeller, the toroidal circuit being otherwise unbladed, to thereby balance the liquid masses in the toroidal circuit at or slightly below 1:1 speed ration and reduce stator losses when the impeller and turbine are locked for direct drive.

A further object is to provide a converter as indicated wherein the second stator is conditioned and arranged to accept widely varying stream lines and accelerate them to a velocity which is substantially uniform across the outlet tips of the second stator blades and hence at the inlets of the impeller blades to thereby provide optimum performance and, particularly, an increase in the stall torque ratio compared to a converter having only an inflow stator.

A further object is to provide a single stage, dual stator converter in which that stator which is adjacent the turbine is conditioned for rotation counter to that of the turbine for the purpose of extending the utility of the converter over a wider range of speed ratios and at and above a determined economic level of efficiency.

These and further objects of the invention will be set forth in the following specification, reference being had to the accompanying drawings, and the novel means by which the objects are effectuated will be definitely pointed out in the claims.

In the drawings:

FIG. 2 is a schematic view showing the shape of the toroidal circuit in the FIG. 1 converter, the relation of the component bladed members, and the position of the mean stream flow line of the circuit.

FIG. 3 is an exploded and developed, schematic view showing the relationship and mean stream flow line shapes of the impeller, turbine and stator blades, the impeller blade being the relatively, low capacity type shown in FIG. 10.

FIGS. 4, 5, 6 and 7 show vectorially the attack angles of the working liquid at indicated speed ratios in relation to the inlet tips of the impeller, turbine and stator blades, respectively, at the mean stream flow line.

FIGS. 8 and 9 are schematic, dimensioned views of the outer and inner, unbladed bends of the toroidal circuit.

Figure 1:
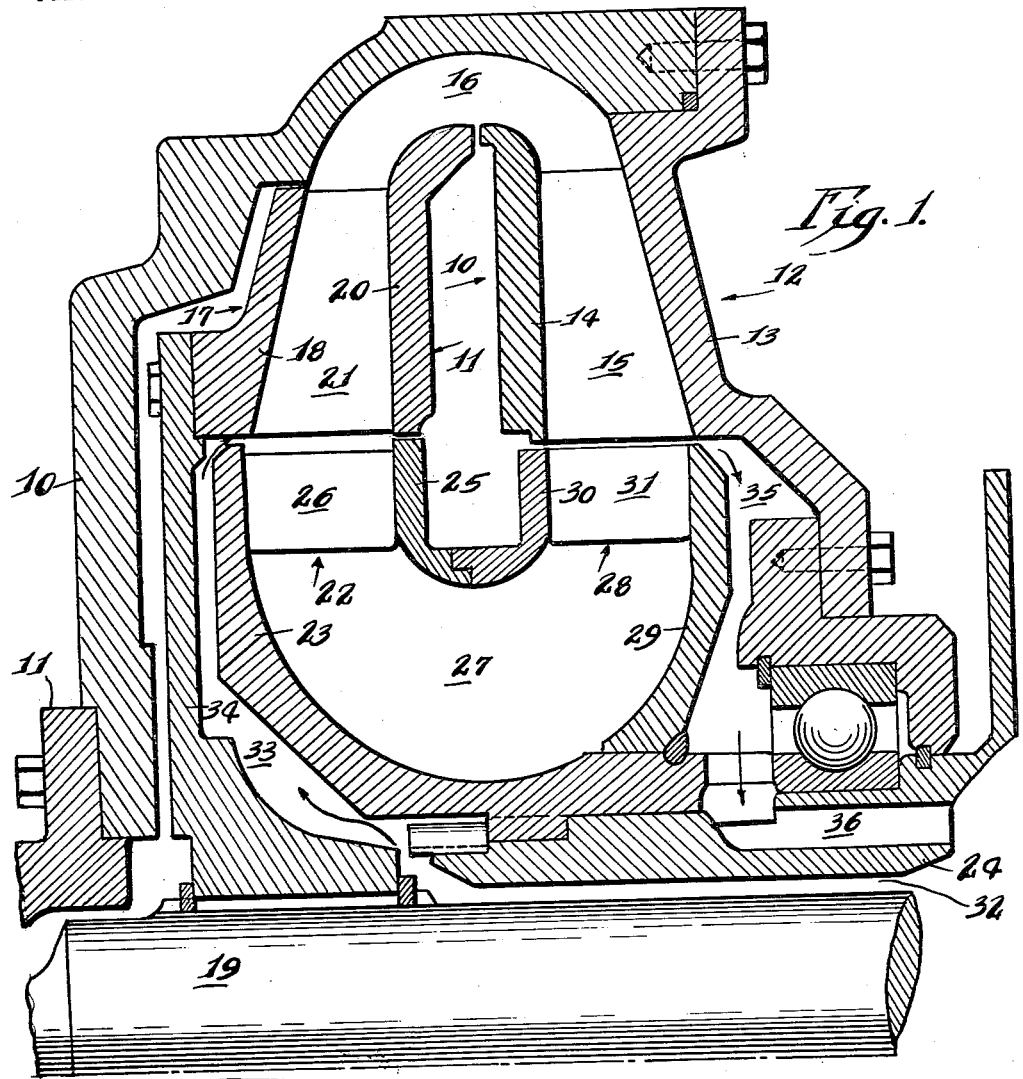
FIG. 1 is a fragmentary, sectional elevation of one form of the hydraulic torque converter.
Figures 10, 11:
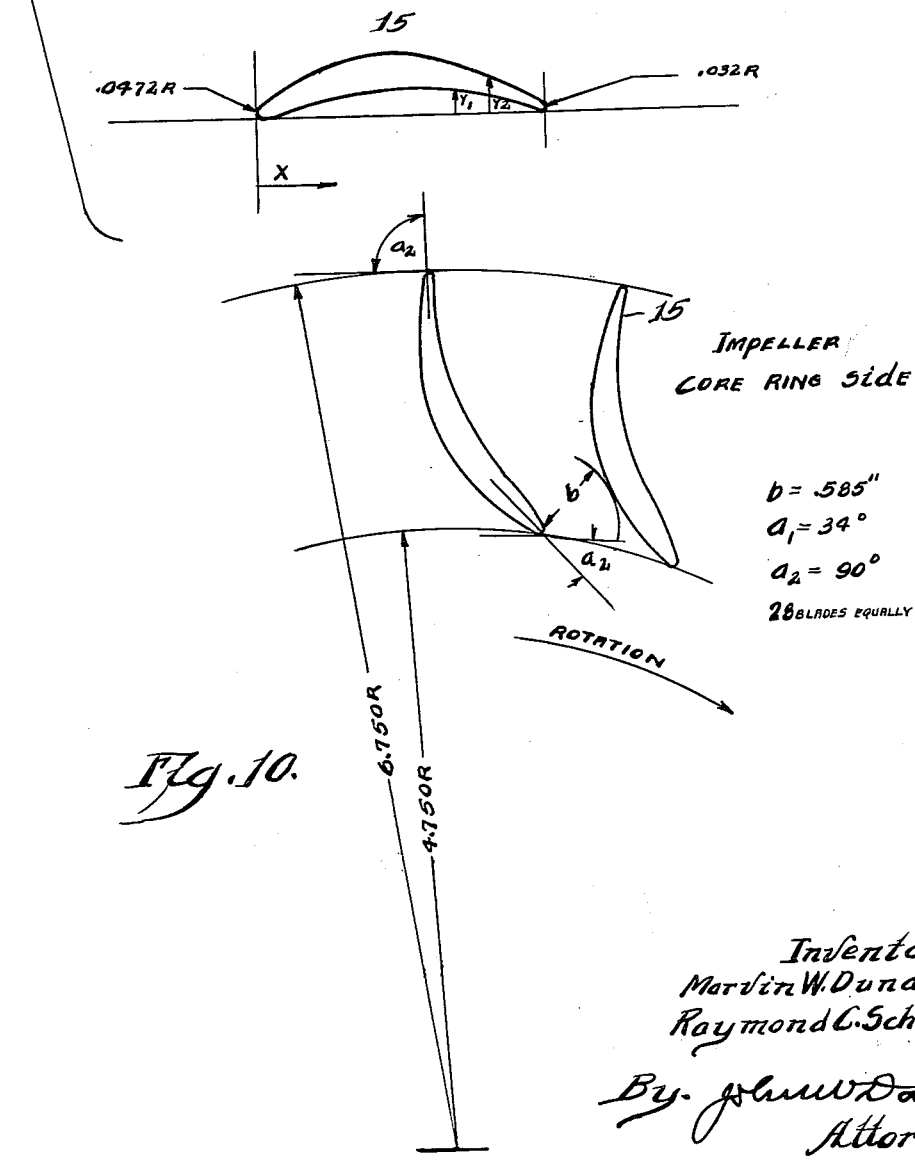
Figure 15:
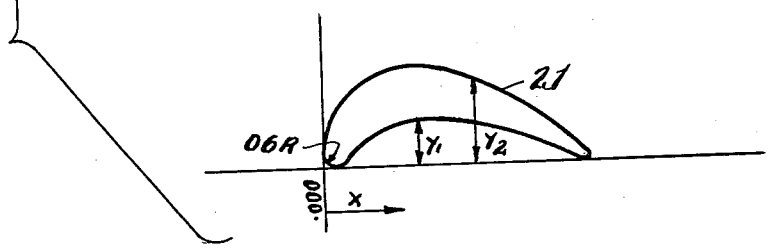
Figure 11:
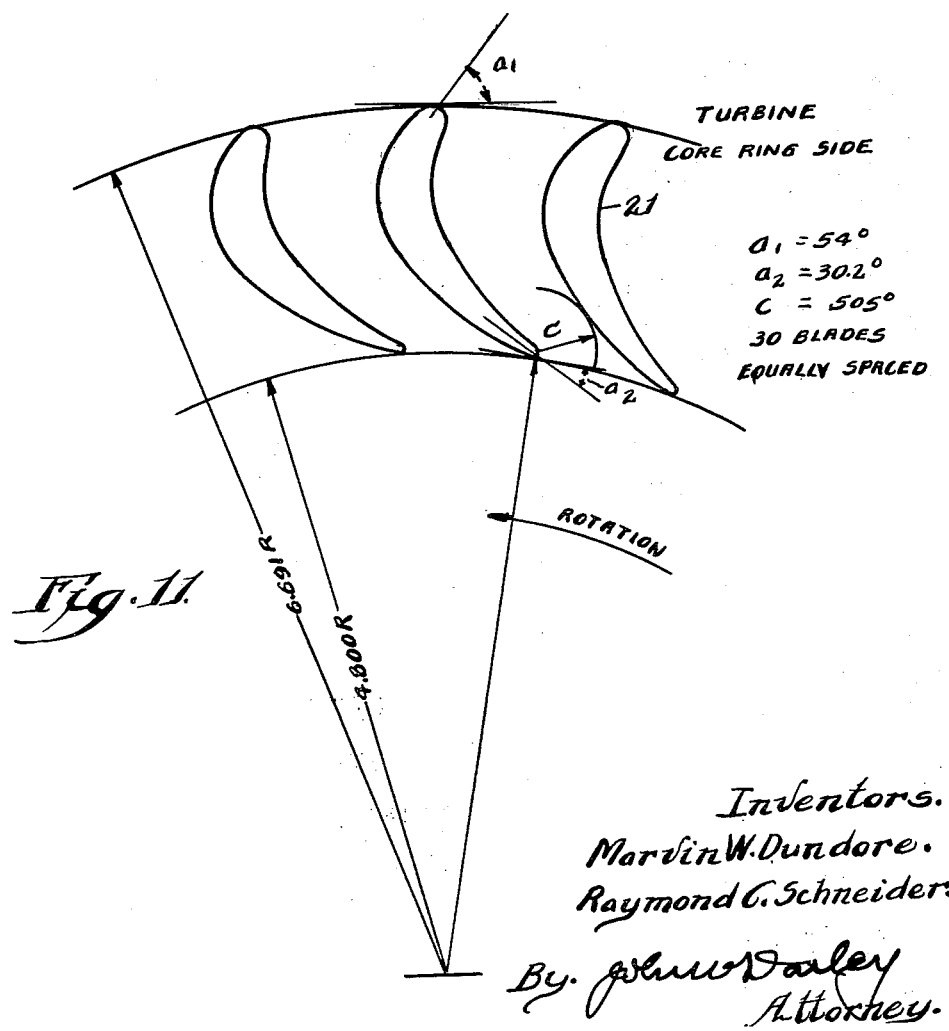
Figure 16:
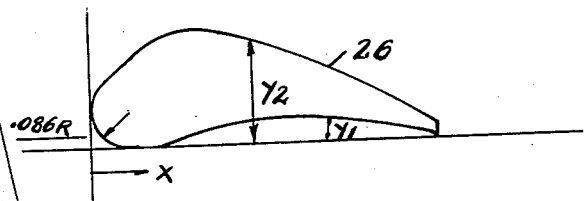
Figure 12:
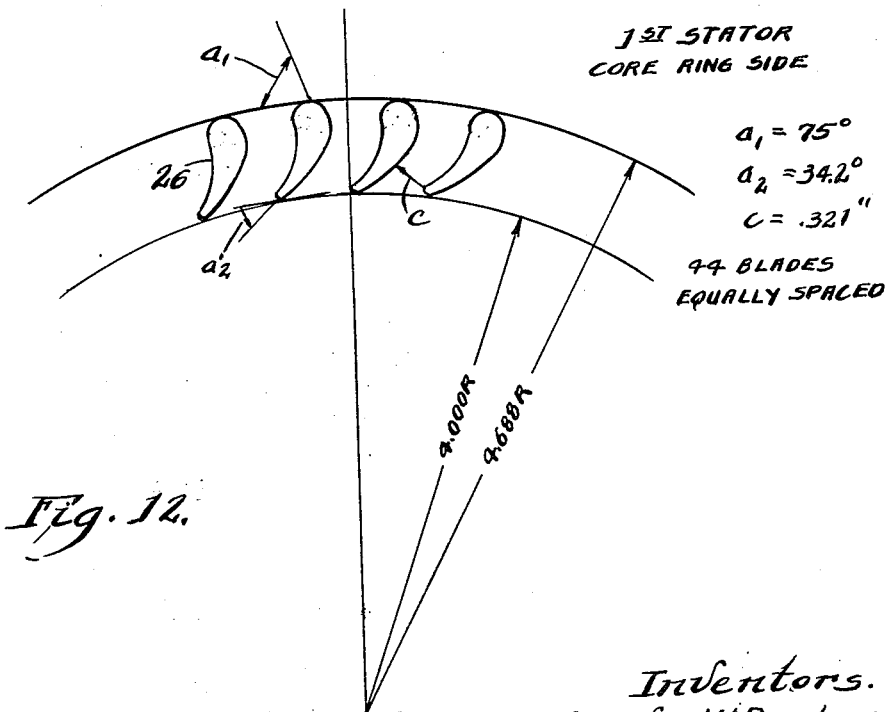
Figure 13:
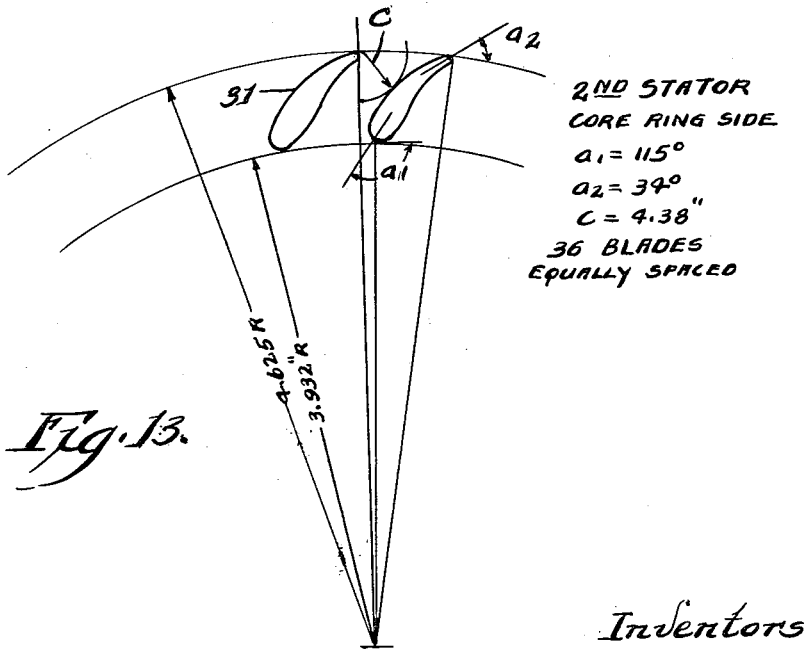

FIGS. 10, 11, 12 and 13 are schematic views of several impeller blades, turbine blades and first and second stator blades, respectively, FIGS. 10 and 13 being viewed in the direction of the arrow 10 and FIGS. 12 and 13 being viewed in the direction of the arrow 11 in FIG. 1, each with suggested inlet and outlet angles ($a_1$ and $a_2$), a suggested distance ($b$) between any adjacent pair of impeller blades at their inlets, and a suggested distance ($c$) between any adjacent pair of turbine blades and of the first and second stator blades, respectively, at their outlets.

FIGS. 14, 15, 16 and 17 are dimensioned views of typical impeller, turbine, first and second stator blades, being related to the comparable blades shown in FIGS. 10, 11, 12 and 13, respectively, the dimensions being tabulated with reference to X- and Y-axes and each blade being considered as lying along the X-axis.

Figure 18:
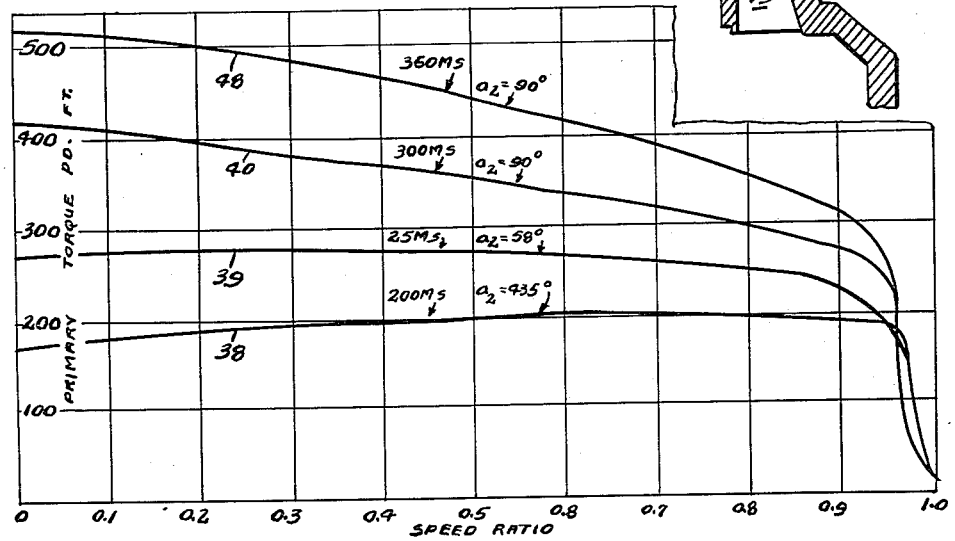

FIG. 18 shows various performance curves relating to results obtainable by varying the outlet angles of the impeller blades and by lengthening these blades to increase their capacity.

Figure 19:
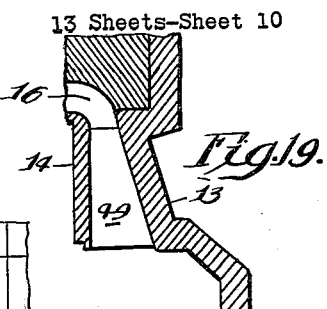

FIG. 19 is a reduced, fragmentary section of the FIG. 1 converter showing a relatively high capacity, impeller blade.

Figure 20:
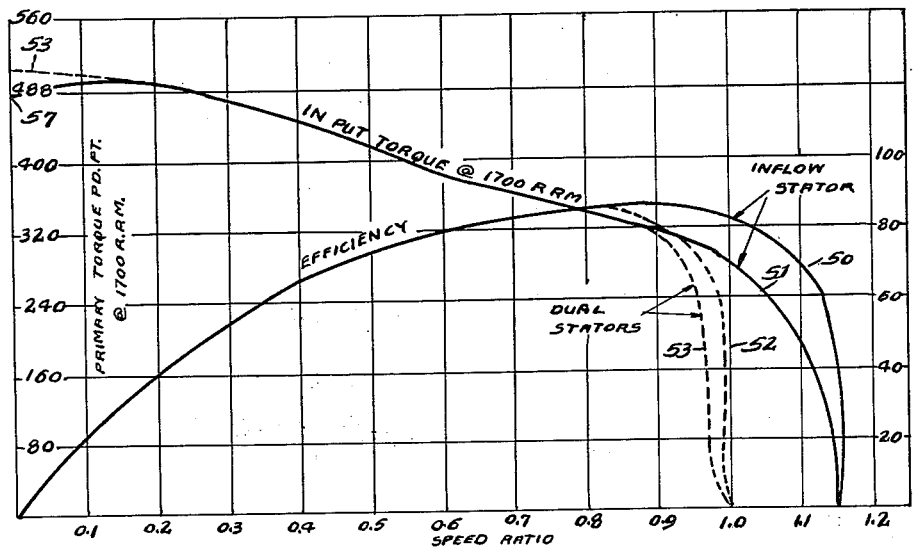

FIG. 20 shows other performance curves indicating comparatively the input torque and efficiency of a single stage, dual stator converter as disclosed herein and a single stage converter having only an inflow stator.

Figure 21:
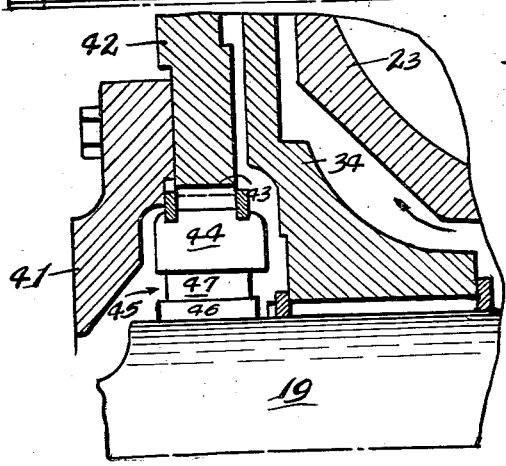

FIG. 21 is a fragmentary, sectional elevation showing a modification of the FIG. 1 converter consisting in the provision of an overruning clutch connection between the impeller and the output shaft.

FIG. 22 is a fragmentary, sectional elevation of a power transmission including the indicated dual stator converter and a gearing system whereby, under controlled conditions, the first stator will rotate counter to the turbine, or will be held stationary.

FIG. 23 is a schematic layout utilizing the power transmission shown in FIG. 22 and a governor control on the operation of the gearing unit.

FIGS. 24, 25 and 26 are schematic, vectorial analyses relating to the FIG. 22 power transmission and showing certain radial tip and liquid velocities at the blades of the turbine and first stator when the turbine is stalled, begins rotating, and has attained a speed sufficient to establish a liquid force on the first stator in the forward direction, respectively.

Figure 27:
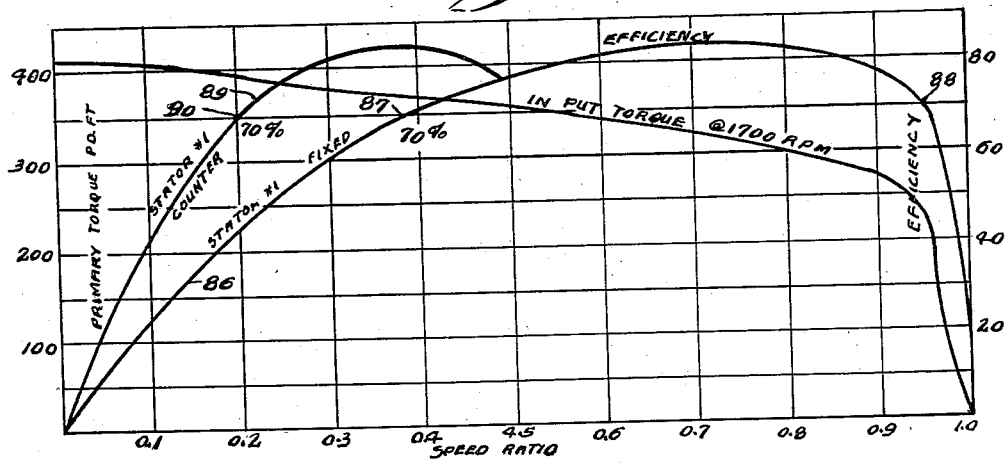
Figure 28:
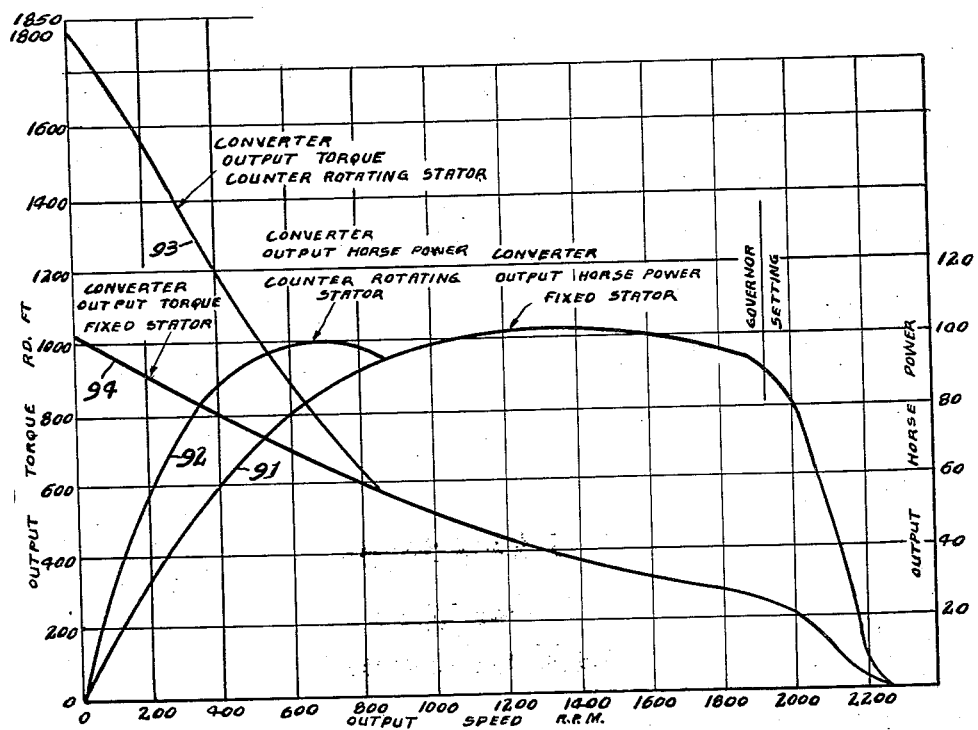

FIGS. 27 and 28 show performance curves relating to the FIG. 22 power transmission.

Referring to FIG. 1, the numeral 10 designates the rotating housing of the converter which has its opposite ends respectively attached to an annular connector 11 providing a driven connection between a source of power and the impeller 12 which includes an end ring 13, a core ring 14 spaced therefrom, and a plurality of blades 15 equispaced around the end ring 13 and core ring 14 and bridged therebetween.

The discharge from the impeller 12 enters one end of a reversely curved, unbladed, outer passage 16 whose opposite end connects with the inlet of a turbine 17 which includes an end ring 18 having splined connection with an output shaft 19, a core ring 20 spaced from the end ring 18, and a plurality of blades 21 equispaced around the end ring 18 and core ring 20 and bridged therebetween.

The discharge from the turbine 17 enters the closely adjacent inlet of a first stator 22 which includes an end ring 23 connected to a stationary sleeve 24 coaxial with and spaced from the shaft 19, a core ring 25, and a plurality of blades 26 equispaced around the end ring 23 and core ring 25 and bridged therebetween.

The discharge from the first stator 22 enters one end of a reversely curved, unbladed, inner passage 27 whose opposite end connects with the inlet of a second stator 28 which includes an end ring 29 fast to the end ring 23, a core ring 30 and a plurality of blades 31 equispaced around the end and core rings 29 and 30, respectively. The outlet tips of the second stator blades 31 are disposed closely adjacent the inlet tips of the impeller blades 15.

As shown in FIG. 1, the impeller 12, passage 16, turbine 17, first stator 22, passage 27 and second stator 28 are related to provide a closed, toroidal path for the working liquid except that the liquid also flows through an external and connected cooler. Generally speaking, the second stator blades 31 and the impeller blades 15 occupy positions in the radial outward flow part of the toroidal circuit, while the turbine blades 21 and second stator blades 26 occupy positions in the radial inward flow part of this circuit. The impeller blades 15, turbine blades 21 and first and second stator blades 26 and 31, respectively, are normally related to the end and core rings 13 and 14, 18 and 20, 23 and 25, and 29 and 30, all respectively.

The shape of the toroidal circuit in relation to the locations of the several blades is an important phase of the invention and its advantages will be subsequently discussed in the development of the operative characteristics of the converter. For the present, it will be noted that the blade contacting faces of the core rings 30 and 14 are coplanar and transverse to the axis of the converter, and that the like faces of the core rings 20 and 15 are also transverse to the same axis. Further, the end ring 13 along the impeller blades 15 is convergingly related to the core ring 14, while the end ring 18 is divergingly related to the core ring 20, both in the direction of flow. The blade contacting faces of the end ring 23 and core ring 25 for the first stator 22 are parallel and the same relation exists between the end ring 29 and core ring 30 for the contacting faces of the second stator blades 31.

The passages 16 and 27 are generally U-shaped or substantially semi-circular and hence effect a 180° change in direction of the liquid flow between the impeller 12 and turbine 17, and between the first stator 22 and second stator 28, respectively. Further, these passages are arranged to provide easy and non-turbulent direction changes in the liquid flowing therethrough to thereby prevent separation of the liquid from the walls of the passages. The requirements for effecting these results will be subsequently discussed.

Dissipation of the heat developed in the working liquid is effected by suitably maintaining a continuous liquid flow through the toroidal circuit and through a connected, external cooler (not shown). The liquid is serially supplied to the converter through an annular passage 32 included between the output shaft 19 and stationary sleeve 24 and an annular passage 33 included between the first stator, end ring 23 and an annular extension 34 of the turbine end ring 18. From the passage 33, the liquid enters the toroidal circuit between the outlet of the turbine 17 and the inlet of the first stator 22. The flow discharges from the toroidal circuit between the outlet of the second stator 28 and the inlet of the impeller 12 into and serially through an annular passage 35 included between the impeller and second stator, end rings 13 and 29, respectively, and a combined port and passage 36 in the stationary sleeve 24. Sufficient basic pressure is maintained by conventional means at the impeller inlet to substantially reduce any tendency of the liquid particles to separate from the surfaces of the impeller blades during operation in the low speed ratio range and a suggested pressure is approximately 40 p.s.i.

The operating characteristics of the FIG. 1 converter are related to the shape of the toroidal circuit as schematically shown in FIG. 2, the respective shapes, inlet and outlet angles of the impeller, turbine and first and second stator blades, and the number of blades in each blade group. The considerations subsequently discussed, including the blade inlet and outlet angles, liquid attack angles and radii are with reference to the mean stream flow line of the toroidal circuit and respective blades as indicated in FIG. 2. The location of the mean stream flow line at any given point in the flow path is determined by the following formula as graphically indicated for the inner curved and unbladed passage 27 in FIG. 9:

$$R_m = \sqrt{\frac{R_i^2 + R_o^2}{2}}$$

wherein $R_m$ = mean radius of a point on the mean stream flow line.

$R_i$ and $R_o$ = inner and outer radius, respectively, of points on the end of a line substantially perpendicular to the torus walls through the point on the mean stream flow line.

The design details for effecting the operating advantages of this converter will now be described. Referring to FIG. 3, there is shown in exploded and developed relation characteristic shapes of the blades in the several stages of the converter and along their mean stream flow lines. The inlet and outlet angles for each blade are designated as "$a_1$" and "$a_2$," respectively, and for the impeller blade 15, the inlet angle is defined as the angle between the tangent to the mean camber line 37 and the tangent to the circle indicated by the radius of rotation of the impeller blade 15 at its inlet tip. The same principle applies to the outlet angle of the impeller blade 15, and to the inlet and outlet angles of the turbine blade 21, and the first and second stator blades 26 and 31, respectively.

Generally speaking, the blade shapes have been designed to provide efficient liquid flow over a wide range of speed ratios. For this purpose, the blade development has been such as to secure high efficiency at the maximum theoretical design point and to accept flow at a number of attack angles with a minimum of shock loss due to separation of the liquid from the blade surfaces with a resulting reduction in efficiency loss, flow over the blades being smooth. Blade design directly determines the capacity, efficiency and other operational characteristics such as the torque ratio at stall, the shape of the torque curve and the speed ratio at which peak efficiency occurs.

Considering a converter equipped with the relatively low capacity, impeller blades 15, turbine blades 21 and first and second stator blades 26 and 31, respectively, and with an appropriate number of blades in each instance (ranges subsequently indicated) to produce a unit having a relatively low specific torque, there are schematically shown in FIGS. 4, 5, 6 and 7 certain suggested structural characteristics of the respective blades.

Referring to FIG. 4, the inlet tip of the impeller blade 15 is designed to accept liquid moving from the second stator 28 (see FIG. 1) over an angular dispersion of from 22° to 75° as indicated by the approach velocity vectors which are related to a speed ratio range of from 0.0 to 0.83, speed ratio being defined as the speed of the turbine divided by that of the impeller. The indicated ranges may be considered in connection with the primary torque curves 38, 39 and 40 shown in FIG. 18 and which relate specific torques to outlet angles of the impeller blades 15.

The dispersion of the approach velocity vectors at the inlet tips of the turbine blades 21 and of the first and second stator blades 26 and 31, respectively (see FIGS. 5, 6 and 7) for the same speed ratio range as the impeller blade 15 is from 29° to 53° for each turbine blade 21, 24° to 152° for each first stator blade 26, and up to 135° for each second stator blade 31. The positions of the bulbous nosed, first stator blades 26 directly at the outlets of the turbine blades 21 enables the stator blades 26 to accept this relatively large dispersion from the turbine blades 21 in all stream lines with maximum efficiency.

The best performance characteristics for the several blades have been obtained with a range of inlet and outlet angles "$a_1$" and "$a_2$," respectively, as follows:

|  | Inlet Angles, degrees | Outlet Angles, degrees |
|---|---|---|
| Impeller Blades | 25 to 48 | 36 to 90 |
| Turbine Blades | 32 to 65 | 22 to 35 |
| First Stator Blades | 74 to 85 | 29 to 39 |
| Second Stator Blades | 115 to 125 | 20 to 38 |

Considering the operating characteristics of the converter shown in FIG. 1, flow through the second stator 28 and impeller 12, and the turbine 17 and first stator 22, is generally radially outward and inward, respectively, of the converter. The blades in the several stages are positioned at right angles to their respective core and end rings as shown in FIG. 1 and are not twisted between their inlet and outlet tips. Further, in the usual type of construction involving a radial outflow impeller and a radial inflow turbine, it is well known that the minimum distance and hence area between a pair of adjacent impeller blades occurs at the inlet between these blades and that this channel area increases towards the blade outlets, whereas the reverse is true for the turbine. Therefore, in this known type of converter, the relative velocity head of the liquid decreases and its pressure head increases as the liquid flows outwardly between the impeller blades in accordance with the law governing flow of liquid through a conduit. The reverse situation occurs in the known radial inflow turbine, i.e., from inlet to outlet, the relative velocity head increases and the pressure head decreases.

Since it is only the kinetic energy imparted to the working liquid by the impeller that has value in exerting a rotational force on the output shaft, it is advantageous to reduce the pressure head development as much as possible. In the present converter, this has been accomplished by contracting the boundary walls of the impeller flow channels from the inlet to the outlet of the impeller 12 and, specifically, by relatively converging the end and core rings 13 and 14, respectively, as shown in FIG. 1. By this arrangement, the increase in each flow channel area in the impeller 12 from the inlet to the outlet thereof may be limited up to about 30% of what it would otherwise be.

In the turbine 17, the boundary walls constituted by the end and core rings 18 and 20, respectively, relatively diverge from the inlet to the outlet and limit the area decrease between the blades up to about 25%.

For the first stator 22, the end and core rings 23 and 25, respectively, are parallel in the regions of their abutment to the first stator blades 26 and the latter are related to limit the area decrease from their inlet to the outlet to about 20%.

Figure 9:
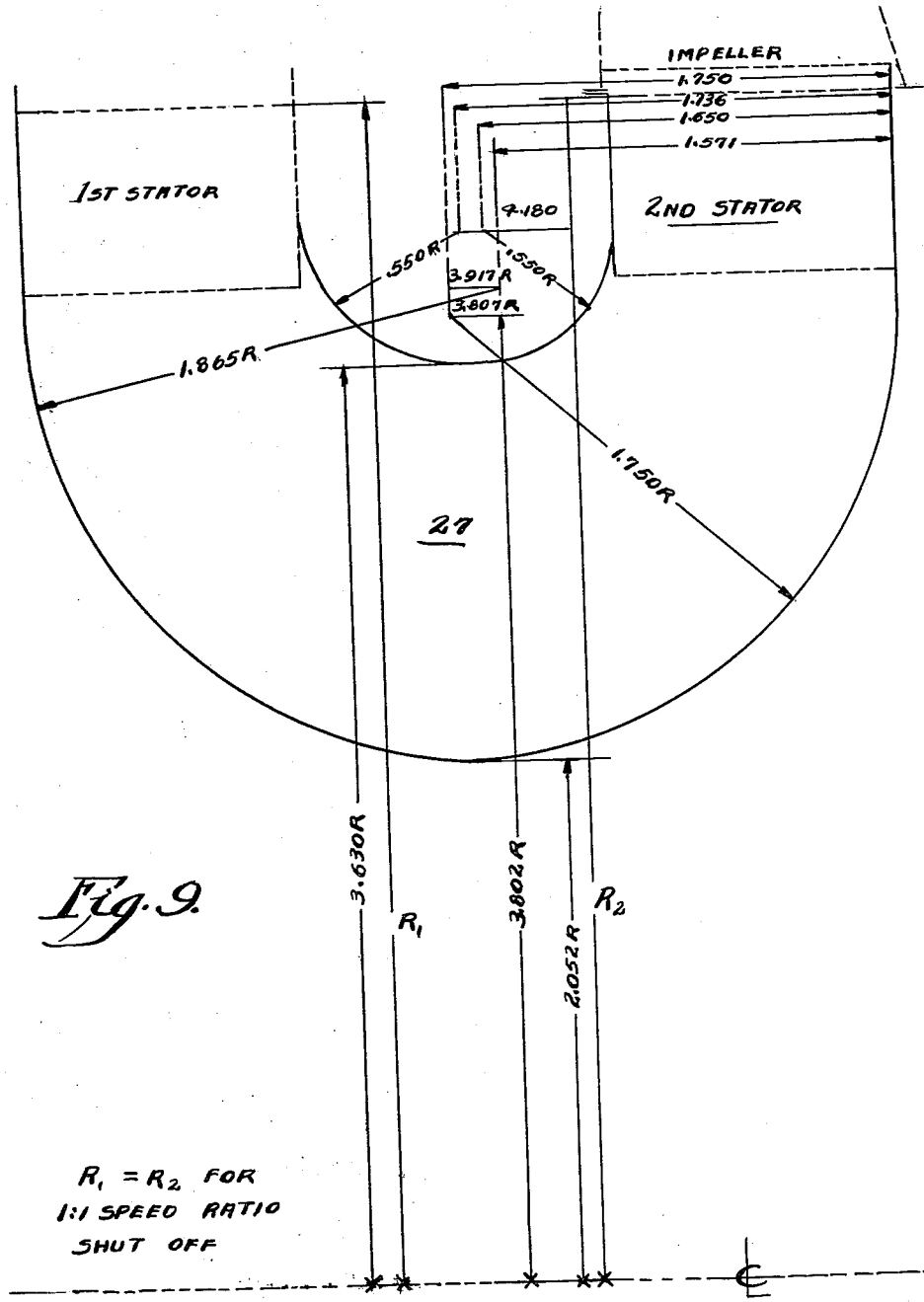
Figure 17:
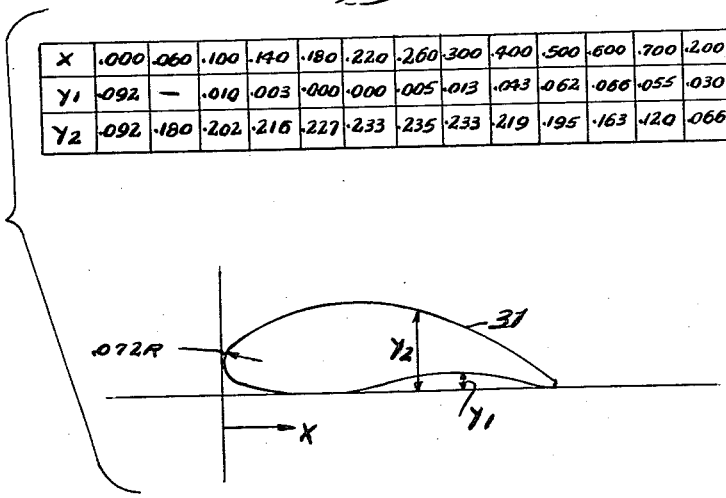

Typical dimensions for the outer and inner, reversely curved and unbladed passages 16 and 27 are shown in FIGS. 8 and 9, all respectively, and are to be considered in conjunction with the specimen impeller blades 15 (FIGS. 10 and 14), turbine blades 21 (FIGS. 11 and 15), first stator blades 26 (FIGS. 12 and 16), and second stator blades 31 (FIGS. 13 and 17). For the purpose of preventing separation of the liquid from the walls of the passages 16 and 27 and subsequent energy losses, the transverse area of the outer or high energy passage 16 is preferably reduced 10 to 15% from the outlet of the impeller 12 to the inlet of the turbine 17, while the inner or low energy passage 27 has its comparable area preferably held constant from the outlet of the first stator 22 to the inlet of the second stator 28, or it may be slightly and gradually decreased in the same direction.

From the foregoing and considering the outer and inner, reversely curved passages 16 and 27, respectively, in conjunction with the converging and diverging flow channels in the impeller and turbine 12 and 17, respectively, it is apparent that the outer peripheral profile of the toridal circuit is substantially pear-shaped.

This converter is defined as being of the low-flow, high-head type and for efficient operation with an oil having a viscosity indicated by the factor SAE No. 10 and using cast aluminum blades having a surface roughness representative of good casting procedure, it has been determined that certain coefficients are necessary to establish the desired flow conditions.

The amount of flow in cubic feet per second moving through the toroidal circuit depends upon the physical characteristics of the impeller and the several bladed and unbladed passages between the outlet and inlet of the impeller, a pressure drop occurring between these parts of the impeller. Considerations affecting the quantity of flow are the size in square feet at given portions of the circuit, disregarding the blades, which is termed the flow channel area, and the further restriction imposed by the blades at their narrowest spacing which is termed the actual flow area.

The indicated coefficients are related to the flow channel area at selected radii of the bladed portions of the toroidal circuit disregarding the presence of the several blades, and to the actual flow area which considers the flow restriction imposed by the blades at their respective closest points. The flow channel area coefficient is defined as the channel area at the selected radius divided by the square of the impeller outlet radius, the channel area being equal to "$2\pi R d$" where "$R$" is the selected radius and "$d$" is the axial distance between the core and end rings in the particular blade location.

The required flow channel area coefficients have the following ranges for the indicated blade locations:

| | |
|---|---|
| Impeller inlet | 0.6 to 0.8 |
| Impeller outlet | 0.6 to 0.8 |
| Turbine inlet | 0.5 to 0.7 |
| Turbine outlet | 0.65 to 0.85 |
| First stator inlet | 0.7 to 0.9 |
| First stator outlet | 0.6 to 0.8 |
| Second stator inlet | 0.7 to 0.9 |
| Second stator outlet | 0.6 to 0.8 |

The actual flow area coefficient is defined as the ratio of the actual area between any pair of adjacent blades to the outlet radius of the impeller squared with the actual area being equal to the minimum distance between any adjacent blade pair times the axial distance between the associated core and end rings times the number of blades in the particular annulus. In the case of the impeller, the indicated minimum distance is adjacent the inlet of the blades thereof since these blades diverge between their inlets and outlets, while for the turbine and both stators, the like distances is adjacent the outlets of of the blades since these blades converge between their inlets and outlets.

The required actual flow area coefficients and their ranges are set forth below for the indicated bladed components of the converter:

| | |
|---|---|
| Impeller | 0.35 to 0.45 |
| Turbine | 0.3 to 0.4 |
| First stator | 0.3 to 0.4 |
| Second stator | 0.4 to 0.5 |

The above coefficients are also applicable to the relatively high flow impeller shown in FIG. 19 and which will be hereinafter described.

For the most efficient operation, a further limitation is that, depending on the size of the converter, the number of impeller blades shall range from 16 to 28, those of the turbine from 24 to 30, those of the first stator from 40 to 48, and those of the second stator from 36 to 46, and these blade ranges are related to the inlet and outlet angle ranges tabulated above.

The operational advantages of the described dual stator converter will be understood from a consideration of FIG. 1. The second stator 28 and the impeller 12 being located in the radially outward flow part of the toroidal circuit, and the turbine 17 and first stator 22 in the radially inward flow part of this circuit, with the first and second stators being symmetrically positioned in the circuit as to the equality of the radii of their inlet and outlet, respectively, the circulating liquid masses in the impeller and turbine are substantially balanced at a speed ratio at or slightly below 1:1 with an accompanying cessation of flow in the toroidal circuit. At this flow shut-off point, therefore, it would be possible to lock the impeller and turbine together for direct drive and the stator losses would be nominal. One method of tying the impeller and turbine together under this condition is by means of a friction clutch (not shown), but well known in the field of torque converters.

An alternative method of providing for a differential speed relation between the impeller 12 and turbine 17 below 1:1 speed ratio and a lockup of these elements at such ratio is shown generally in FIG. 21 in which parts identical with those in FIG. 1 carry the same numerals. An annular connector 41 functionally the same as the connector 11 is secured to a rotating housing 42 that is comparable to the housing 10 and is annularly toothed at 43 for driving connection with the outer race 44 of a conventional freewheel or overrunning clutch 45 whose inner race is fastened to the output shaft 19, the usual rollers or sprags 47 being interposed between the races. When the rotative speed of the shaft 19 equals or exceeds that of the housing 42, the clutch 45 engages in the usual manner. This arrangement may be used for starting the engine of a vehicle so equipped on cold days by pushing with another vehicle.

An additional advantage of the second stator 28 is its capacity for improving flow through the toroidal circuit and, in particular, to enable the impeller 12 to operate at optimum efficiency. Referring to FIG. 1, it will be apparent that as the working liquid traverses the unbladed passage 27, the centrifugal forces acting on the liquid particles adjacent the outer surface of the passage 27 are greater than those on the particles adjacent the inner surface of the passage so that the pressure on the outer surface is higher. Expressed in terms of stream line velocities, the above condition means that the liquid velocity at the inner bend of the passage 27 is higher than that at the outer bend.

Considering the converter without the second stator 28, it will be apparent that, because of the foregoing flow situation in the passage 27, the liquid attack angle at the junction of the impeller inlet tip with the core ring 14 would vary from that at the junction of the same tip with the end ring 13. It is desirable for optimum performance, however, that the flow direction shall be the same and at the design angle across the entire width of the inlet tip of the impeller 12 since the latter acts basically as a diffusor in that its blades diverge from their inlet to the outlet.

The second stator 28 adequately solves this problem since the channels thereof, which converge from their inlet to the outlet, accept the widely varying stream lines delivered by the passage 27 and accelerate them in accordance with conduit law to a uniform velocity distribution at the outlet of the second stator 28 and hence at the inlet of the impeller 12. The indicated velocity flow control could be effected by continuous stator blades extending from the inlet of the first stator 22 to the outlet of the second stator 28, but such continuous blades present a difficult manufacturing problem. By providing instead the separate first and second stators 22 and 28, respectively, the shapes of these blades enable them to be made by a simple extrusion, rolling, stamping or casting process which are considerably less difficult and cheaper to effect than the more complicated shapes presented by the indicated continuous blading.

Typical primary torque curves for the FIG. 1 converter are shown in FIG. 18. One such curve is identified by the numeral 40 for a converter having a specific torque "Ms" of 300 pds. ft. and employing the dimensioned impeller blade 15 shown in FIGS. 10 and 14, the dimensioned turbine blade 21 shown in FIGS. 11 and 15, the dimensioned first stator blades 26 shown in FIGS. 12 and 16, and the dimensioned second stator blades 31 shown in FIGS. 13 and 17. For this specific design, the impeller 12 includes twenty-eight blades, the turbine 17 has thirty blades, the first stator 22 has forty-four blades, and the second stator 28 has thirty-six blades, all blades being equally spaced around their respective members.

The other primary torque curves, heretofore designated by the numerals 38 and 39, indicate the characteristics of converters having specific torques of 200 pds. ft. and 250 pds. ft., and impeller blade outlet angles "$a_2$" of 43.5° and 58°, all respectively. Curves 38, 39 and 40 also indicate the effect on the torque absorptive capacity of the impeller produced by varying the outlet angles "$a_2$" of its blades; increasing the outlet angle increases this capacity at a given input speed.

A variant arrangement which retains the ability to provide flow shut-off at or slightly below 1:1 speed ratio while producing a more rising torque absorption curve is represented by the curve 48 in FIG. 18 which indicates a specific torque of 350 pds. ft. with an impeller blade outlet angle of 90°. This curve is obtained by the use of the relatively high capacity, impeller blade 49 (see FIG. 19) which is interposed between the end ring 13 and core ring 14 as in FIG. 1 except that the outlet tip of the blade 49 extends partially into the outer passage 16 so that such tip has a larger radius than the outlet tip of the impeller blade 15.

The curves in FIG. 20 show further characteristics of this converter derived from the addition of the second stator 28 and by way of comparison with a single stage converter having only an inflow stator comparable to the first stator 26. The efficiency and input torque curves for the single inflow stator are designated by the numerals 50 and 51, respectively, while the like curves for the dual stator converter are denoted by the numerals 52 and 53, respectively. In the single inflow stator, the circulation shut-off in the toroidal circuit occurs at 1.15:1 speed ratio while in the dual stator unit, the same condition has shifted to slightly under 1:1 speed ratio. Further, the primary or input torque at stall, i.e., the starting torque, is higher for the dual stator converter (curve 53) than for the single inflow stator converter (curve 51). This situation indicates an improvement in the liquid flow in the toroidal circuit brought about by the addition of the second stator 28.

In FIG. 22 is shown a converter incorporating the features of the FIG. 1 unit, but associated with a modified planetary gear to provide for counter rotation of the first stator under controlled conditions for the purpose of extending the usable range of the converter as hereinafter defined. This converter includes a rotating housing 54 appropriately driven by a source of power, an impeller 55 forming a part of the housing 54, a turbine 56, a first stator 57 and a second stator 58, all of which are related to form a toroidal circuit including outer and inner, U-shaped passages 59 and 60, respectively, as in FIG. 1 with the exception that the first stator 57 is conditioned so that it may be held in position or rotated counter to the turbine 56. As in FIG. 1, the turbine 56 has driving connection with an output shaft 61 and the second stator 58 is fast to a stationary sleeve 62 carrying a bearing 63 on which the rotating housing 54 is journaled. The sleeve 62 is attached to a housing 64 that serves as a stationary planet carrier and will be so termed hereinafter and which forms part of a modified planetary transmission 65 that is concentric with the output shaft 61, this transmission being representative of any gearing system that provides for differential speeds between its input and output.

The first stator 57 is secured to one end of a sleeve 66 that extends through the sleeve 62 and is spaced therefrom and from the shaft 61, the sleeve 66 being respectively piloted on a bearing 67 carried by the shaft 61 and journaled on a bearing 68 carried by the planet carrier 64. The other end of the sleeve 66 is secured to the inner periphery of a disk 69 whose outer portion is attached to a ring gear 70 forming part of the modified planetary transmission 65. The ring gear meshes with the large end of each of a plurality of stepped planet pinions 71, only one being shown, that is journaled on a cantilever pintle 72 supported at one end in the carrier 64. The small end of the pinion 71 meshes with a sun gear 73 that is connectible with the output shaft 61 through an overrunning clutch generally indicated by the numeral 74. Engageable with the outer periphery of the ring gear 70 under conditions as presently outlined is a brake 75 of conventional type.

From the foregoing, it will be apparent that, since each planet pinion 71 is permanently grounded in the sense that it cannot rotate around the output shaft 61, fixation or capacity for counter rotation of the first stator 57 is determined by engagement or disengagement, respectively, of the brake 75. A systemic control for the FIG. 22 unit is schematically shown in FIG. 23 to which reference will now be made.

A power input shaft 76 connects with the impeller 55 and the turbine 56 connects with the output shaft 61 as above described, and the converter and modified planetary transmission 65 are otherwise related as shown in FIG. 22. A speed ratio governor 77 connects through flexible cables or shafts 78 and 79 with the input and output shafts 76 and 61, all respectively, so that the speeds of these shafts at any instant will determine some conditioning of the governor 77. The internal construction of the governor 77 is such that, at some predetermined speed ratio, a valve (not shown) in the governor opens to permit a liquid drawn from a sump 80 by a pump 81 and pushed through a line 82 to exert pressure against a piston 83 which connects by appropriate linkage with the brake 75. A governor of this type is shown in the application of Conrad R. Hilpert, Ser. No. 669,306, filed July 1, 1957, now U.S. Letters Patent No. 2,913,931, dated November 24, 1959, which is owned by the assignee of this application.

Therefore, at and above the indicated speed ratio, the engagement of the brake 75 holds the ring gear 70 stationary and accordingly the first stator 57 and the converter then functions in the manner described for FIG. 1, the overrunning clutch 74 being released. However, when the speed ratio drops below the control value, the governor valve closes, the brake 75 releases and the ring gear 70 is freed for rotation along with the first stator 57 due to the thrust of liquid discharged by the turbine 56. Under this condition, the rotation of the first stator 57 is opposite to that of the turbine 56 and in effect acts like a second turbine in applying torque through the modified planetary transmission 65 and overrunning clutch 74 to the output shaft 61. Specifically, the first stator torque is multiplied by a factor determined by the overall gear ratio in the modified planetary transmission 65 to thereby substantially increase the total output torque of the converter as will hereinafter be discussed by reference to performance curves.

The particular relationship shown in FIG. 23 is not critical as to the counter rotation ability of the first stator 57, i.e., it is not necessary that the turbine 56 and sun gear 73 have a common driving relation to the output shaft 61 and that the first stator 57 be tied to the ring gear 70. The known flexibility of a modified planetary transmission permits the just stated relationship to be reversed as long as the planet pinions 71 are grounded against rotation around the output shaft 61. Accordingly, the turbine 56 may be connected to the ring gear 70 and the first stator 57 would then be connected to the sun gear 73. In either instance, the first stator 57 would rotate counter to the turbine 56 and at a speed equal to, or higher or lower than that of the turbine depending upon which element of the modified planetary transmission 65 the turbine 56 or the first stator 57 is connected to and the gear ratios in the planetary transmission 65.

The flow situations and rotative relations existing between the blades 84 of the turbine 56 and the blades 85 of the first stator 57 under the several conditions outlined are schematically and vectorially shown in FIGS. 24, 25 and 26 wherein the several vector values are defined as follows:

$v$=liquid velocity relative to blade
$V$=resultant absolute liquid velocity
$U$=peripheral velocity of blade tip The above quantities additionally carry subscripts "1" or "2" depending upon whether they apply to the inlet or outlet tips of the respective blades.

In FIG. 24, the turbine 56 is stalled, but is applying a force tending to rotate the output shaft 61 and the brake 75 is released. At the same time, the liquid in flowing over the first stator blades 85 is turned between their inlet and outlet tips with consequent changes in the vectors "$v$" and "$V$" and the force derived from this turning multiplied by the gear ratio in the modified planetary transmission 65 is also applied and tends to rotate the output shaft 61. This arrangement therefore provides a higher stall torque than could be achieved by the converter alone.

As the engine power is increased or the load is decreased, the turbine 56 begins rotating in its normal direction (see FIGURE 25) and the first stator 57 rotates in the opposite direction at a speed determined by the gear ratio in the planetary transmisison 65. Liquid, represented by its relative velocity vector "$v_1$," begins moving around the bulbous inlet tip of the first stator blade 85 as may be noted by comparison with the direction of the same vector in FIG. 24, the stalled condition.

Continuing the action with FIG. 26, the vector "$v_1$" has moved to a position unloading the blade 85 and any further increase in speed would create a liquid force tending to rotate the first stator 57 in the same direction as the turbine 56 and the functional advantage of counter rotation is no longer available. It is at this point that the governor 77 effects engagement of the brake 75 and a fixation of the first stator 57 so that power flow at speed ratios above the point in question is solely through the converter. At this time also, the overrunning clutch 74 kicks free and the turbine 56 and output shaft 61 are not burdened by losses in the modified planetary transmission 65.

The performance curves shown in FIGS. 27 and 28 graphically indicate the advantages of the FIG. 22 converter when associated with the control system shown in FIG. 23. Usable range is an important factor in hydraulic torque converter operation and is defined as that speed ratio range of operation in which the efficiency of the converter is above some desirable economic level, assumed in this instance and by way of example to be 70%. Within the indicated speed ratio range, a working factor, termed the utility ratio, is defined as the speed ratio at the high speed 70% point divided by the speed ratio at the low speed 70% point.

Referring to FIG. 27 and the efficiency curve 86 obtained when the first stator 57 is fixed, the usable range is between the low and high speed 70% points as designated, respectively, by the numerals 87 and 88. This condition reflects a utility ratio of about 2.46:1. However, when the first stator 57 rotates counter to the turbine 56, the efficiency curve, designated by the numeral 89, crosses the 70% level at a point designated by the numeral 90 which is the then low speed 70% point and which is at a substantially lower speed ratio than the fixed stator, low speed 70% point. Between the points 88 and 90, the efficiency curve is entirely above the 70% level so that the usable range is substantially increased relative to that between the points 87 and 88 and as represented by a utility ratio of about 4.75:1.

The counter rotating, efficiency curve 89 represents, as determined by an appropriate gear ratio in the planetary transmisison 65, an equality of speed relationship between the turbine 56 and first stator 57. If the first stator 57 rotates faster than the turbine 56, the curve 89 will rise more sharply from 0:0 speed ratio and will cross the 70% level at a lower speed ratio than that indicated by the numeral 90, while if the first stator 57 counter rotates slower than the turbine 56, the curve 89 will rise less sharply than as shown in FIG. 27 and will cross the 70% level at a higher speed ratio than that indicated by the numeral 90. Operating conditions will determine the selection of the speed relationship between the turbine 56 and first stator 57.

FIG. 28 shows further performance curves plotted against output torque and output horsepower as ordinates and output speed as abscissa when the FIG. 23 converter is associated with a typical diesel engine. One set of these curves graphically compare the usefulness of the engine-converter package above a given output horsepower level in relation to a range of output speed where the first stator 57 is fixed and rotates counter to the turbine 56, respectively. By way of example, the selected output horsepower level is eighty.

With the first stator 57 fixed, the output horsepower curve 91 extends above the indicated level between 600 and 2000 r.p.m. so that what may be termed the horsepower ratio is 3.33:1, while with the first stator 57 counter rotating, the output horsepower curve 92 crosses the 80 hp. level at 330 r.p.m. to give a horsepower ratio of 6.07:1. The relationship between these ratios indicates that to meet the added range provided by the counter rotating stator 57, it would be necessary if this stator were fixed to couple with the converter a gear train having a ratio of 1.82:1. In other words, and since the brake 75 can be engaged under full power conditions, the FIG. 23 converter provides the equivalent of a two-speed, power shift transmisison with low mechanical losses.

The other set of curves, designated by the numerals 93 and 94, represent the pronounced sharper rise in output torque with a decrease in output speed under counter rotating and fixed, first stator conditions, respectively.

We claim:

1. An hydraulic torque converter of the rotating housing, single stage type comprising a bladed impeller, a bladed turbine and bladed first and second stators arranged to form a toroidal liquid circuit, the impeller and second stator being located in the outward flow part of the circuit with the outlets of the second stator blades being diposed closely adjacent the inlets of the impeller blades and the turbine and first stator blades being located in the inward flow part of the circuit with the outlets of the turbine blades being disposed closely adjacent the inlets of the first stator blades, the outlets and inlets of the impeller and turbine blades and the outlets and inlets of the first and second stator blades being respectively connected by U-shaped, outer and inner, unbladed passages, the impeller, turbine and first and second stator sets of blades being bridged between respective core and end rings which include a flow channel therebetween and in which the flow channel area coefficients, disregarding the blades, are defined as the channel area at the inlets and outlets of the respective blades divided by the square of the impeller outlet radius, the channel area being equal to $2\pi Rd$ wherein "R" is the radius of each blade inlet and outlet and "d" is the axial distance between the associated core and end rings, the flow channel area coefficients at the impeller inlet and outlet ranging from 0.6 to 0.8 and 0.6 to 0.8, at the turbine inlet and outlet from 0.5 to 0.7 and 0.65 to 0.85, at the first stator inlet and outlet from 0.7 to 0.9 and 0.6 to 0.8, and at the second stator inlet and outlet from 0.7 to 0.9 and 0.6 to 0.8, all respectively, and wherein the actual flow area coefficient for each set of blades is defined as the actual area between an adjacent pair of blades in said set divided by the square of the impeller radius, said actual area being equal to the minimum spacing between said pair of blades times the axial distance between the associated core and end rings times the number of blades in the set, the actual flow area coefficients for the impeller varying from 0.35 to 0.45, for the turbine from 0.3 to 0.4, for the first stator from 0.3 to 0.4, and for the second stator from 0.4 to 0.5.

2. An hydraulic torque converter of the rotating housing, single stage type comprising a bladed impeller, a bladed turbine and bladed first and second stators arranged to form a toroidal liquid circuit, the impeller and second stator being located in the radial outward flow part of the circuit with the outlets of the second stator blades being disposed closely adjacent the inlets of the impeller blades and the turbine and first stator being located in the radial inward flow part of the circuit with the outlets of the turbine blades being disposed closely adjacent the inlets of the first stator blades, the outlets and inlets of the first and second stator blades and the outlets and inlets of the first and second stator blades being respectively connected by U-shaped, inner and outer, unbladed passages, the first stator being conditioned to be held in position and to rotate counter to the turbine above and below a predetermined speed ratio of the converter, respectively, including means for adding the torque of the first stator when rotating to the torque of the turbine.

3. An hydraulic torque converter as defined in claim 2 wherein the turbine is connected to an output shaft and the first stator is connectible serially through a gear mechanism and an overrunning clutch with the output shaft, and means for locking the gear mechanism against power flow therethrough above a predetermined speed ratio of the converter to thereby hold the first stator stationary and for releasing the gear mechanism below said speed ratio whereby the first stator rotates counter to the turbine and applies its torque to the output shaft.

4. An hydraulic torque converter as defined in claim 3 wherein the gear mechanism comprises a transmission having a fixed planet carrier, an input member connected to the first stator and an output member connectible through an overrunning clutch with the output shaft, and means for holding the input member and the first stator stationary above a predetermined speed ratio of the converter to thereby deny power flow through the transmission and to free the input member for rotation under the counter rotation impulse provided by the first stator below said speed ratio whereby the torque of the latter is applied to the output shaft.

5. An hydraulic torque converter as defined in claim 2 wherein the impeller and turbine are respectively connected to input and output shafts and the first stator connects with the input member of a transmission having a fixed planet carrier and whose output member is connectible through an overrunning clutch with the output shaft, and control means including a governor simultaneously responsive to the speeds of the input and output shafts and a brake engageable with the input member upon a conditioning of the governor above a predetermined speed ratio of the converter to thereby hold the first stator against rotation and disengaged below said speed ratio whereby the first stator is freed for rotation counter to the turbine and applies its torque to the output shaft.

6. An hydraulic torque converter of the rotating housing, single stage type comprising a bladed impeller, a bladed turbine and bladed first and second stators arranged to form a toroidal liquid circuit, the impeller and second stator being located in the outward flow part of the circuit with the outlets of the second stator blades being diposed closely adjacent the inlets of the impeller blades and the turbine and first stator blades being located in the inward flow part of the circuit with the outlets of the turbine blades being disposed closely adjacent the inlets of the first stator blades, the outlets and inlets of the impeller and turbine blades and the outlets and inlets of the first and second stator blades being respectively connected by U-shaped, outer and inner, unbladed passages, the outlet and inlet tips of the second stator and impeller blades, respectively, being coextensive axially of the converter and each second stator blade has a uniform dimension radially of the converter and the flow channel between each adjacent pair of second stator blades decreases from the inlet to the outlet thereof whereby the liquid flow from the inner passage is uniformly accelerated through each second stator channel.

7. An hydraulic torque converter as defined in claim 3 wherein the gear mechanism includes a ring gear connected to the first stator, planet pinions held against revolution around the axis of the converter, a sun gear and an overrunning clutch connecting the sun gear to the output shaft, and power flow through the gear mechanism above and below said speed ratio is respectively determined by holding and releasing the ring gear.

8. An hydraulic torque converter of the rotating housing, single stage type comprising a bladed impeller, a bladed turbine and bladed first and second stators arranged to form a toroidal liquid circuit, the impeller and second stator being located in the outward flow part of the circuit with the outlets of the second stator blades being disposed closely adjacent the inlets of the impeller blades and the turbine and first stator blades being located in the inward flow part of the circuit with the outlets of the turbine blades being disposed closely adjacent the inlets of the first stator blades, the outlets and inlets of the impeller and turbine blades and the outlets and inlets of the first and second stator blades being respectively connected by U-shaped, outer and inner, unbladed passages, each blade at the mean stream flow line of the toroidal circuit having an inlet and an outlet angle measured, respectively, between the mean camber line of the blade and the tangents to circles determined by the radii of the inlet and outlet tips of the blade, the inlet and outlet angles for the impeller ranging from 25° to 48° and 36° to 90°, for the turbine from 32° to 65° and 22° to 35°, for the first stator from 74° to 85° and 29° to 39°, and for the second stator from 115° to 125° and 30° to 38°, all respectively, the impeller having from 16 to 28 blades, the turbine from 24 to 30 blades, the first stator from 40 to 48 blades, and the second stator from 36 to 46 blades.

9. An hydraulic torque converter as defined in claim 1 wherein each blade at the mean stream flow line of the toroidal circuit has an inlet and an outlet angle measured, respectively, between the mean camber line of the blade and the tangents to circles determined by the radii of the inlet and outlet tips of the blade, the inlet and outlet angles for the impeller ranging from 25° to 48° and 36° to 90°, for the turbine from 32° to 65° and 22° to 35°, for the first stator from 74° to 85° and 29° to 39°, and for the second stator from 115° to 125° and 30° to 38°, all respectively, and the impeller has from 16 to 28 blades, the turbine from 24 to 30 blades, the first stator from 40 to 48 blades, and the second stator from 36 to 46 blades.

References Cited in the file of this patent
UNITED STATES PATENTS

| | | |
|---|---|---|
| 2,196,585 | Gette | Apr. 9, 1940 |
| 2,292,384 | Lysholm | Aug. 11, 1942 |
| 2,325,876 | Pollard | Aug. 3, 1943 |
| 2,379,015 | Lysholm | June 26, 1945 |
| 2,850,918 | Pollard | Sept. 9, 1958 |